(12) United States Patent
Roodenburg et al.

(10) Patent No.: US 8,540,092 B2
(45) Date of Patent: Sep. 24, 2013

(54) HOISTING CRANE WITH ANNULAR BEARING STRUCTURE

(75) Inventors: Joop Roodenburg, Delft (NL); Gerrit Van Wijk, Ridderkerk (NL); Adriaan Jan Rodenburg, Rotterdam (NL)

(73) Assignee: Itrec B.V., Schiedam (NL)

( * ) Notice: Subject to any disclaimer, the term of this patent is extended or adjusted under 35 U.S.C. 154(b) by 869 days.

(21) Appl. No.: 12/523,499

(22) PCT Filed: Jan. 17, 2008

(86) PCT No.: PCT/NL2008/000017
§ 371 (c)(1),
(2), (4) Date: Oct. 15, 2009

(87) PCT Pub. No.: WO2008/088213
PCT Pub. Date: Jul. 24, 2008

(65) Prior Publication Data
US 2010/0044331 A1    Feb. 25, 2010

Related U.S. Application Data

(63) Continuation-in-part of application No. 11/653,958, filed on Jan. 17, 2007, now abandoned.

(51) Int. Cl.
*B66C 23/84*    (2006.01)
(52) U.S. Cl.
USPC .......................................... 212/253; 384/455
(58) Field of Classification Search
USPC ................. 212/253; 384/129, 416, 440, 441, 384/455
See application file for complete search history.

(56) References Cited

U.S. PATENT DOCUMENTS

| | | | |
|---|---|---|---|
| 2,414,573 A * | 1/1947 | Wagner et al. | 212/253 |
| 4,126,361 A | 11/1978 | Böttner et al. | |
| 4,216,870 A * | 8/1980 | Bonneson et al. | 212/223 |

(Continued)

FOREIGN PATENT DOCUMENTS

| | | |
|---|---|---|
| EP | 0 158 015 A2 | 10/1985 |
| WO | WO-2004/076902 A2 | 9/2004 |
| WO | WO-2005/123566 A | 12/2005 |

*Primary Examiner* — Sang Kim
*Assistant Examiner* — Juan Campos, Jr.
(74) *Attorney, Agent, or Firm* — Birch, Stewart, Kolasch & Birch, LLP

(57) ABSTRACT

This invention relates to a hoisting crane comprising a column, a jib and a jib connection member which is disposed on the column and to which the jib is connected pivotably. The crane further comprises an annular bearing structure extending around the column guiding and carrying the jib connection member rotatable about the column. The annular bearing structure comprises one or more column bearing parts connected to the column, comprising column bearing surfaces associated with the vertical column and one or more jib bearing parts connected to the jib connection member, comprising jib bearing surfaces associated with the jib connection member. A first column bearing surface is oriented substantially vertically and is arranged in a radial direction more inwards than a first jib bearing surface arranged opposite the first column bearing surfaces, to support radially inwards directed horizontal loads from the jib connection member to the column. A second column bearing surface is oriented substantially horizontally and is arranged below a second jib bearing surface arranged opposite the second column bearing surfaces to support downwardly directed vertical loads from the jib connection member to the column. According to a first aspect of the invention, a third column bearing surface is oriented substantially vertically and is arranged in a radial direction more outwards than a third jib bearing surface arranged opposite the third column bearing surface.

4 Claims, 12 Drawing Sheets

(56) References Cited

U.S. PATENT DOCUMENTS 4,248,488 A * 2/1981 Sable .......................... 384/593
6,357,921 B1 * 3/2002 Dittenhofer .................. 384/455
8,002,472 B2 * 8/2011 Craig et al. .................. 384/455

* cited by examiner

HOISTING CRANE WITH ANNULAR BEARING STRUCTURE

This application is the National Phase of PCT/NL2008/000017 filed on Jan. 17, 2008, which claims priority to U.S. application Ser. No. 11/653,958 filed on Jan. 17, 2007, which is hereby expressly incorporated by reference into the present application.

BACKGROUND OF THE INVENTION

The invention relates to a hoisting crane comprising:
a substantially hollow vertical column comprising a foot and a top and a body between the foot and the top,
a jib,
a jib connection member which is disposed on the column and to which the jib is connected pivotably,
an annular bearing structure extending around the column guiding and carrying the jib connection member rotatable about the column, the annular bearing structure comprising:
  one or more column bearing parts connected to the column, comprising column bearing surfaces associated with the vertical column; and
  one or more jib bearing parts connected to the jib connection member, comprising jib bearing surfaces associated with the jib connection member;
wherein a first column bearing surface is oriented substantially vertically and is arranged in a radial direction more inwards than a first jib bearing surface arranged opposite the first column bearing surface, to support radially inwards directed horizontal loads from the jib connection member to the column;
wherein a second column bearing surface is oriented substantially horizontally and is arranged below a second jib bearing surface arranged opposite the second column bearing surface to support downwardly directed vertical loads from the jib connection member to the column.

Hoisting cranes of this type have already been commercially available from the applicant for decades, in particular for installation on a vessel, such as for example a cargo vessel, a tender vessel used in the offshore industry, etc.

WO2005123566 describes a hoisting crane of the above-mentioned type. An annular bearing structure extends around the vertical column and guides and carries a jib connection member, so that the jib connection member, and therefore the jib, can rotate about the column. As an example, it is disclosed that the annular bearing structure comprises one or more guide tracks which extend around the column and on which an annular bearing component of the jib connection member is supported via running wheels. Two jib securing supports are arranged on the jib connection member. Drive motors for rotating the jib connection member each have a pinion, which engages with a toothed track.

Vertical load components arise from the own weight of the jib connection member and the jib, and from loads applied to the jib. When loading the jib, not only vertical forces arise but also radially inward and radially outward directed forces. When heavier loads are to be handled by the crane, a more robust crane construction is required to compensate for these forces, in particular to compensate for the radially outward directed forces. In particular the bearing structure needs to be stronger and more robust and stiff, and hence heavier.

SUMMARY OF THE INVENTION

It is an object of the invention to propose an improved hoisting crane. The proposed improvements allow a lighter construction of the crane.

According to a first embodiment of the invention, the hoisting crane is characterized in that the annular bearing structure further comprises a third column bearing surface which is oriented substantially vertically and which is arranged in a radial direction more outwards than a third jib bearing surface associated with the jib connection member arranged opposite the third column bearing surface. These additional bearing surfaces compensate for the radially outward directed forces and prevent possible displacement which can result from these forces. The column bearing part prevents the jib bearing part from moving in an outward radial direction. The column bearing part thus retains the jib bearing part. As a result of this bearing construction absorbing outwardly directed forces, the required crane construction can be less robust and hence lighter.

Alternatively the invention provides a second embodiment in which a hoisting crane comprises:
a substantially hollow vertical column comprising a foot and a top and a body between the foot and the top,
a jib,
a jib connection member which is disposed on the column and to which the jib is connected pivotably,
an annular bearing structure extending around the column guiding and carrying the jib connection member rotatable about the column, the annular bearing structure comprising:
  one or more column bearing parts connected to the column, comprising column bearing surfaces associated with the vertical column; and
  one or more jib bearing parts connected to the jib connection member, comprising jib bearing surfaces associated with the jib connection member;
wherein a first column bearing surface is oriented substantially vertically and is arranged in a radial direction more inwards than a first jib bearing surface arranged opposite the first column bearing surfaces, to support radially inwards directed horizontal loads from the jib connection member to the column;
wherein a second column bearing surface is oriented substantially horizontally and is arranged below a second jib bearing surface arranged opposite the second column bearing surfaces to support downwardly directed vertical loads from the jib connection member to the column;
and wherein the jib bearing parts and the jib connection member comprise opposite recesses in which one or more splines are provided to connect the jib bearing parts with the jib connection member. In this embodiment radially outward directed forces are absorbed/compensated by pre-stressing of the jib bearing surfaces associated with the jib.

A possible method of pre-stressing of the bearing surface associated with the jib connection member is by heating the bearing surface provided on a bearing part associated with the jib connection member to cause expansion of the bearing part associated with the jib. A metal bearing part may be heated e.g. up to 60° C. or more. Subsequently the vertical bearing surface associated with the jib connection member is assembled around the vertical bearing surface associated with the column and cooled down. Cooling down causes shrinkage of the bearing part, causing circumferentially uniform stresses in a radially inward direction. These stresses counteract radially outward directed displacement of one or more of the bearing parts associated with the jib connection member.

The object of the invention is alternatively achieved by a hoisting crane which is characterized in that the jib bearing parts and the jib connection member comprise opposite recesses in which one or more splines are provided to connect the jib bearing parts with the jib connection member. These splines enforce the jib bearing parts, the jib connection member and its mutual connection, and in particular enforce its resistance against the tangentially directed forces. As a result of this bearing construction absorbing outwardly directed forces, the required crane construction can be less robust and hence lighter.

It is well conceivable to combine the above-indicated alternative embodiments, to obtain an improved hoisting crane according to the invention.

Further advantageous embodiments are described in the dependent claims and in the following description with reference to the drawing.

DETAILED DESCRIPTION OF THE DRAWINGS

Figure 1:
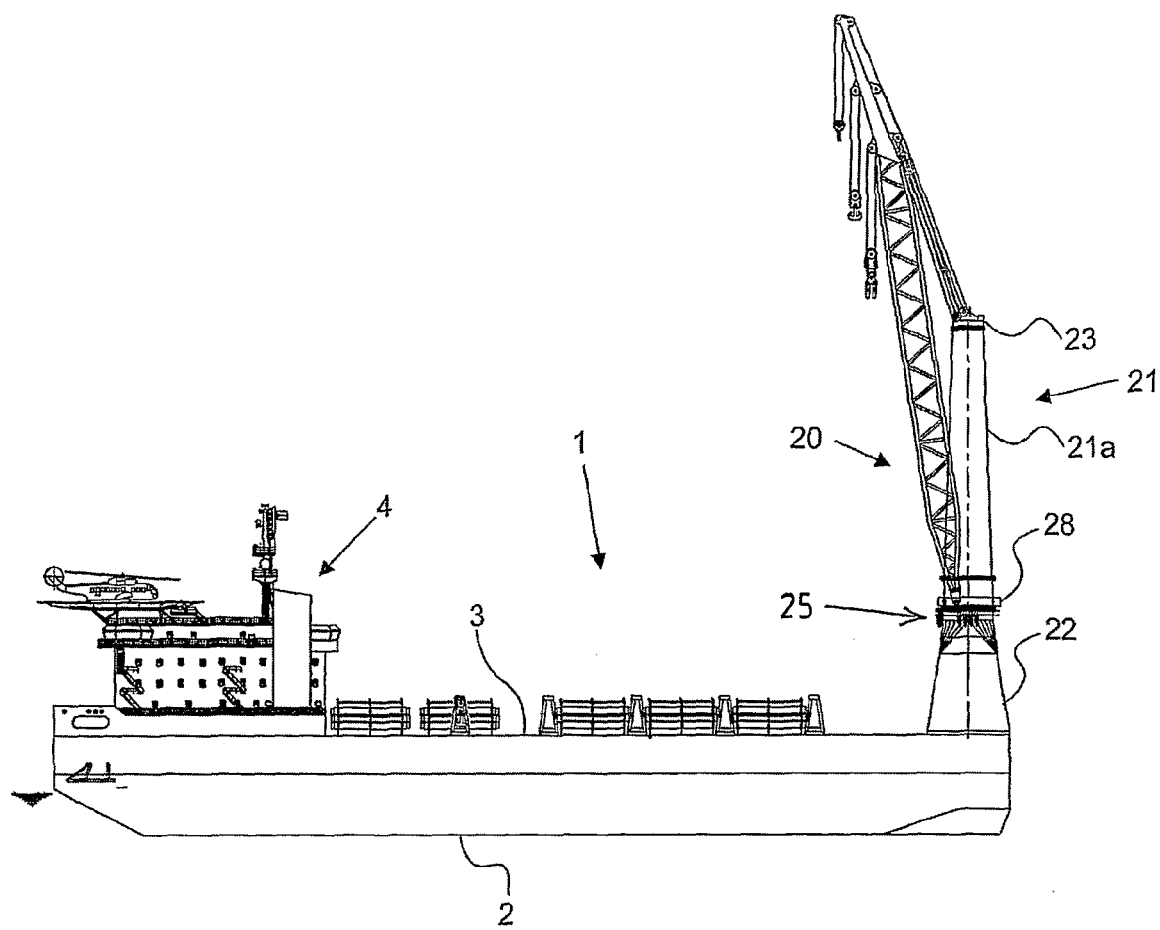
FIG. 1 diagrammatically depicts a vessel comprising a hoisting crane.

FIG. 1 is a side view of a vessel 1 comprising a hoisting crane 20 comprising a bearing structure 25 according to the invention. The vessel 1 has a hull 2 with a working deck 3 and, at the front of the hull 2, a superstructure 4 for crew accommodation, etc. The vessel 1 has a hoisting crane 20, disposed at the rear side of the vessel 1, which hoisting crane 20 has a vertical structure fixed to the hull 2. The hoisting crane 20 will be described in more detail below.

Figure 2:
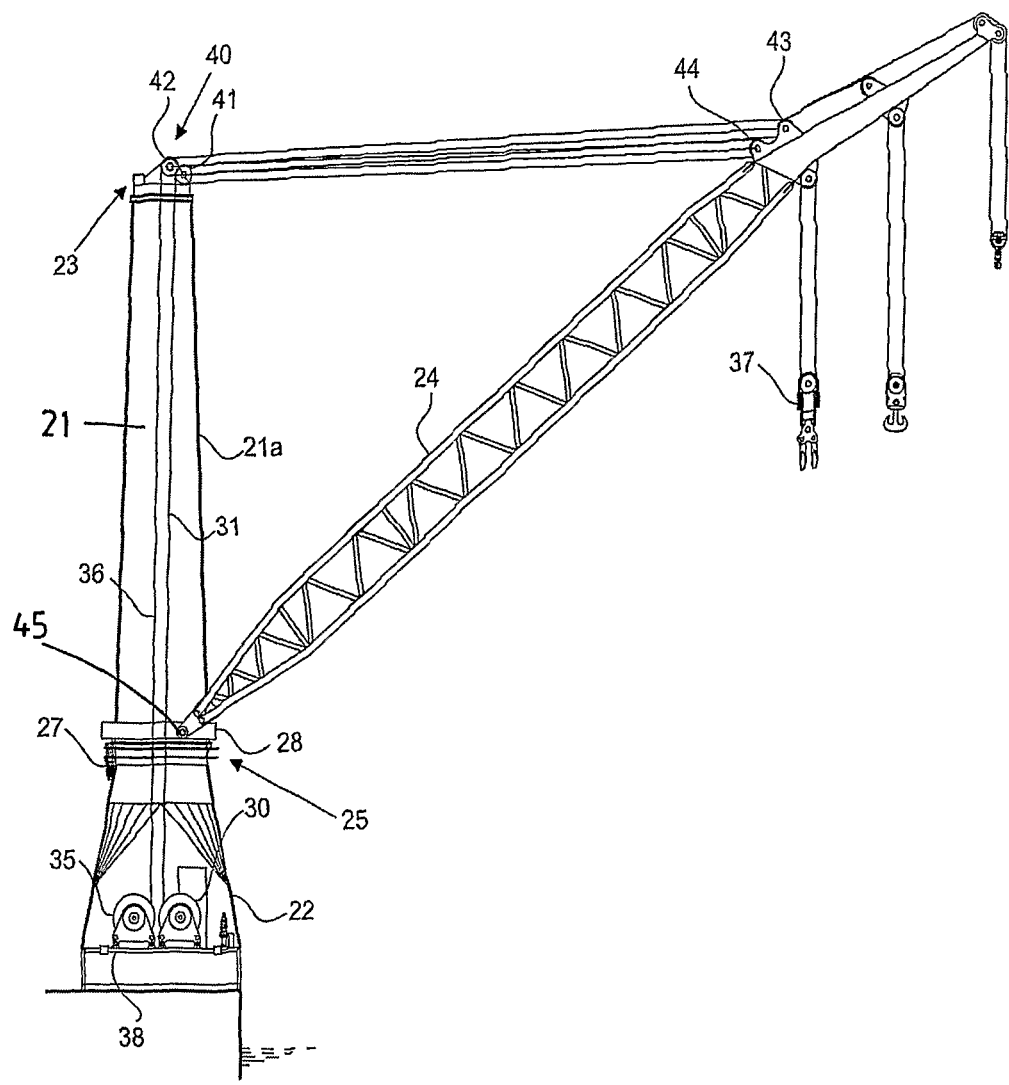
FIG. 2 shows a hoisting crane at the rear side of a vessel, partially in the form of a cut-away view.

The hoisting crane 20, which is illustrated in detail in FIG. 2, has a substantially hollow vertical column 21 with a foot 22, which in this case is fixed to the hull 2 of the vessel 1. Alternatively, the foot 22 of the crane 20 can be fixed to any other support, e.g. a quay on the mainland. Furthermore, the column 21 has a top 23. Between the foot and the top the column 21 has a body 21a. Furthermore the hoisting crane 20 comprises a jib 24.

An annular bearing structure 25 extends around the vertical column 21 and guides and carries a jib connection member 28, so that the jib connection member 28, and therefore the jib 24, can rotate about the column 21. The annular bearing structure will be discussed in more detail below. In this case, the jib 24 is connected pivotably to the jib connection member 28 via a substantially horizontal pivot axis 45, so that the jib 24 can also be pivoted up and down. There is at least one drive motor 27 for displacing the jib connection member 28 along the annular bearing structure 25.

To pivot the jib 24 up and down, there is a topping winch 30 provided with a topping cable 31 which engages on the jib 24.

Furthermore, the hoisting crane 20 comprises a hoisting winch 35 for raising and lowering a load, with an associated hoisting cable 36 and a hoisting hook 37. At the top 23 of the column 21 there is a top cable guide 40 provided with a cable pulley assembly 41 for the topping cable 31 and with a second cable pulley assembly 42 for the hoisting cable 36.

One or more third cable pulley assemblies 43 for the hoisting cable 36 and a fourth cable pulley assembly 44 for the topping cable 31 are arranged on the jib 24. The number of cable parts for each cable can be selected as appropriate by the person skilled in the art.

The winches 30 and 35 are in this case disposed in the foot 22 of the vertical column 21, so that the topping cable 31 and the hoisting cable 36 extend from the associated winch 30, 35 upward, through the hollow vertical column 21 to the top cable guide 40 and then towards the cable guides 43, 44 on the jib 24.

The top cable guide 40 has a rotary bearing structure, for example with one or more running tracks around the top of the column 21 and running wheels, engaging on the running tracks, of a structural part on which the cable pulley assemblies are mounted. As a result, the top cable guide can follow rotary movements of the jib about the vertical column 21 and adopt substantially the same angular position as the jib 24.

The top cable guide 40 may have an associated drive motor assembly which ensures that the top cable guide 40 follows the rotary movements of the jib 24 about the column 21, but an embodiment without drive motor assembly is preferred.

The winches 31 and 35 are in this embodiment arranged on a movable winch support 38, which is mounted movably with respect to the vertical column 21. The winch support 38 here is located in the vertical crane structure, preferably in the region of the foot 22 under the circular cross section part of the column 21, and is mechanically decoupled from the top cable guide 40. The support 38 could e.g. also be arranged in the hull of the vessel below the column, e.g. the foot could have an extension which extends into the hull.

Figure 3:
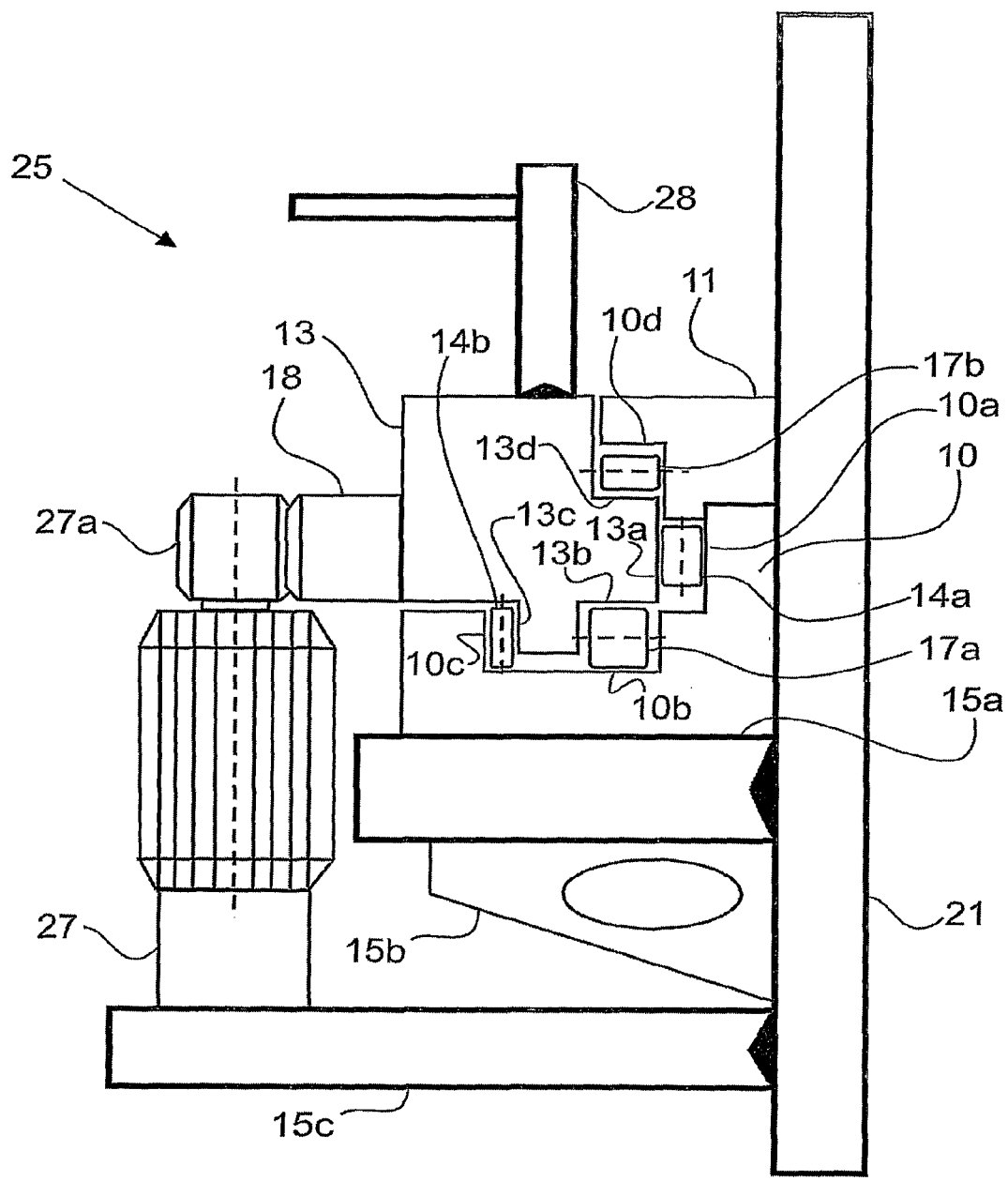
FIG. 3 shows a preferred embodiment of an annular bearing according to the first aspect of the invention.

In FIG. 3 a preferred embodiment of an annular bearing structure 25 is shown. The annular bearing structure 25 is provided between the vertical column 21 and the jib connection member 28 and comprises, in this embodiment, two column bearing parts 10, 11 connected to the column 21. The column bearing parts 10, 11 comprise bearing surfaces associated with the vertical column 21. The annular bearing structure 25 of the shown embodiment further comprises a single jib bearing part 13 connected to the jib connection member, comprising jib bearing surfaces associated with the jib connection member 28.

The annular bearing structure preferably comprises multiple interconnected circle segments of column bearing parts and jib bearing parts. All bearing surfaces of such a segment may be provided at a single bearing part, such as the jib bearing surfaces on jib bearing part 13 as shown in FIG. 3. Alternatively, the bearing surfaces of such a segment may be provided at multiple bearing parts, such as the column bearing surfaces on column bearing parts 10, 11 in FIG. 3.

It is conceivable to provide an annular bearing structure comprising bearing parts not fully extending over the entire 360° circular bearing. For example, column bearing parts according to the invention may be provided at few discrete locations, possibly alternated by conventional column bearing parts without the third column bearing surface. Alternatively, intermittent jib bearing parts may be applied combined with a fully extending column bearing parts. It is noted that such intermittent bearing parts are not applicable when rollers or the like are provided between the bearing surfaces.

Load bearing supports 15a, 15c are connected to vertical column 21 by welding. Support 15a is further supported by beam 15b. Column bearing parts 10, 11 are connected to each other and to load bearing support 15a, for example by a bolt (not shown). Jib bearing part 13 is connected to the jib connection member 28 by welding.

The shown annular bearing structure 25 comprises a substantially vertically extending first column bearing surface 10a and a first jib bearing surface 13a, wherein the first column bearing surface 10a provided on bearing part 10 associated with the vertical column 21 is arranged in a radial direction more inwards than the first jib bearing surface 13a provided on bearing part 13 associated with the jib connection member 28. First jib bearing surface 13a is arranged opposite first column bearing surface 10a, and in this embodiment the bearing surfaces are also arranged parallel. This construction supports radially inwards directed horizontal loads from the jib connection member to the column.

The shown annular bearing structure further comprises a substantially horizontally extending second column bearing surface 10b and a second jib bearing surface 13b, wherein the second column bearing surface 10b provided on bearing part 10 associated with the vertical column 21 is arranged below the second jib bearing surface 13b provided on bearing part 13 associated with the jib connection member 28. Second jib bearing surface 13b is arranged opposite second column bearing surface 10b, and in this embodiment the bearing surfaces are also arranged parallel. This construction supports downwardly directed vertical loads from the jib connection member 28 to the column 21. These loads e.g. occur as a result of hoisting by the crane.

The annular bearing structure further comprises a third vertically extending column bearing surface 10c, and a third jib bearing surface 13c, wherein the third column bearing surface 10c provided on bearing part 10 associated with the vertical column 21 is arranged in a radial direction more outwards than third jib bearing surface 13c provided on bearing part 13 associated with the jib connection member 28. Third jib bearing surface 13c is arranged opposite third column bearing surface 10c, and in this embodiment the bearing surfaces are also arranged parallel. This construction prevents radially outward directed displacement of bearing part 13 associated with the jib connection member 28, which possibly occur at the side of the bearing opposite the jib.

The annular bearing structure further comprises a fourth horizontally extending column bearing surface 10d and a fourth horizontally extending jib bearing surface 13d, wherein fourth column bearing surface 10d provided on bearing part 11 associated with the vertical column 21 is arranged above fourth jib bearing surface 13d provided on bearing part 13 associated with the jib connection member 28, to support upwardly directed vertical loads from the jib connection member to the column 21, which possibly occur as a result of the use of the crane. Fourth jib bearing surface 13d is arranged opposite fourth column bearing surface 10d, and in this embodiment the bearing surfaces are also arranged parallel.

Between opposite vertical first column bearing surface 10a and first jib bearing surface 13a, and between opposite vertical third column bearing surface 10c and third jib bearing surface 13c, first and second vertical rollers 14a, 14b with a vertical axis are provided respectively. Between opposite horizontal second column bearing surface 10b and second jib bearing surface 13b, and between opposite horizontal fourth column bearing surface 10d and fourth jib bearing surface 13d, first and second horizontal rollers 17a, 17b with a horizontal axis are provided respectively to facilitate the mutual movement of the bearing surfaces.

Alternatively, ball bearings, a lubricant, water or any other type of intermediate between the bearing surfaces may be applied.

A gear ring 18 with is provided around bearing part 13 associated with the jib connection member 28. Gear ring 18 has teeth projecting radially outwards. At least one drive motor 27 being connected with the column 21 may drive a pinion 27a which engages with the gear ring 18, driving the jib connection member 28 around column 21. In a preferred embodiment, three or four drive motors are provided at one side of the column 21, usually opposite a common position of the jib 28.

Figure 4:
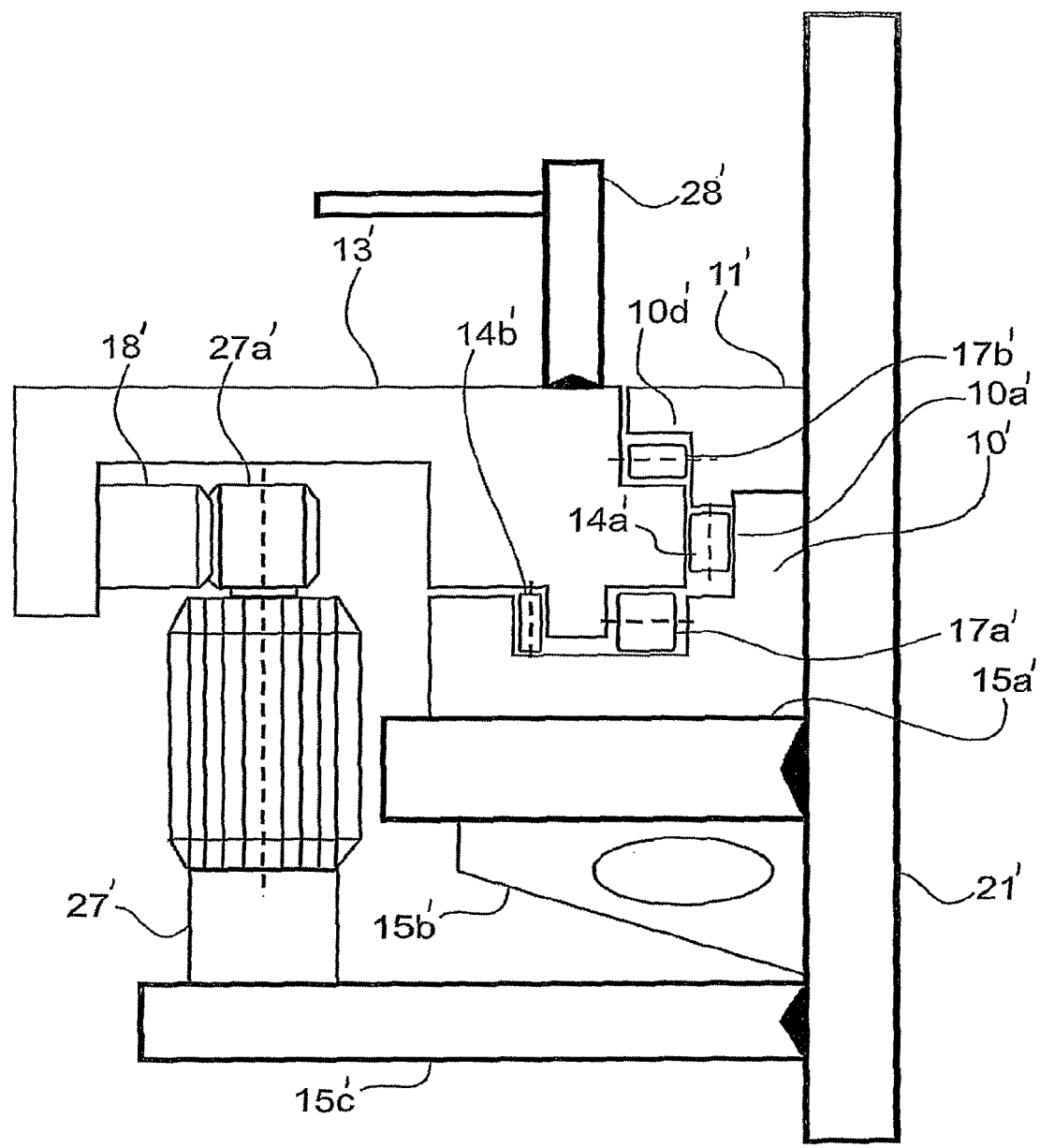
FIG. 4 shows an alternative embodiment of an annular bearing according to the first aspect of the invention.

An alternative drive arrangement is presented in FIG. 4. Same parts are indicated with same numbers, provided with a single prime ('). The drive motor 27' is still connected with the column 21' and drives pinion 27a', which engages with the gear ring 18', driving the jib connection member 28' around column 21'. In the arrangement of FIG. 4, however, the gear ring 18' is provided inside bearing part 13', having teeth projecting radially inwards. This is particularly advantageous since in case of deformation wherein the bearing part 13' associated with the jib connection member 28' moves in an outward radial direction a clearance between gear ring 18' and pinion 27a' arises. This is less damaging to the motor than the embodiment shown in FIG. 3. In case of deformation wherein the bearing part 13 associated with the jib connection member 28 moves in an outward radial direction in the embodiment of FIG. 3 gear ring 18 will damage pinion 27a and possibly also motor 27.

Figure 5:
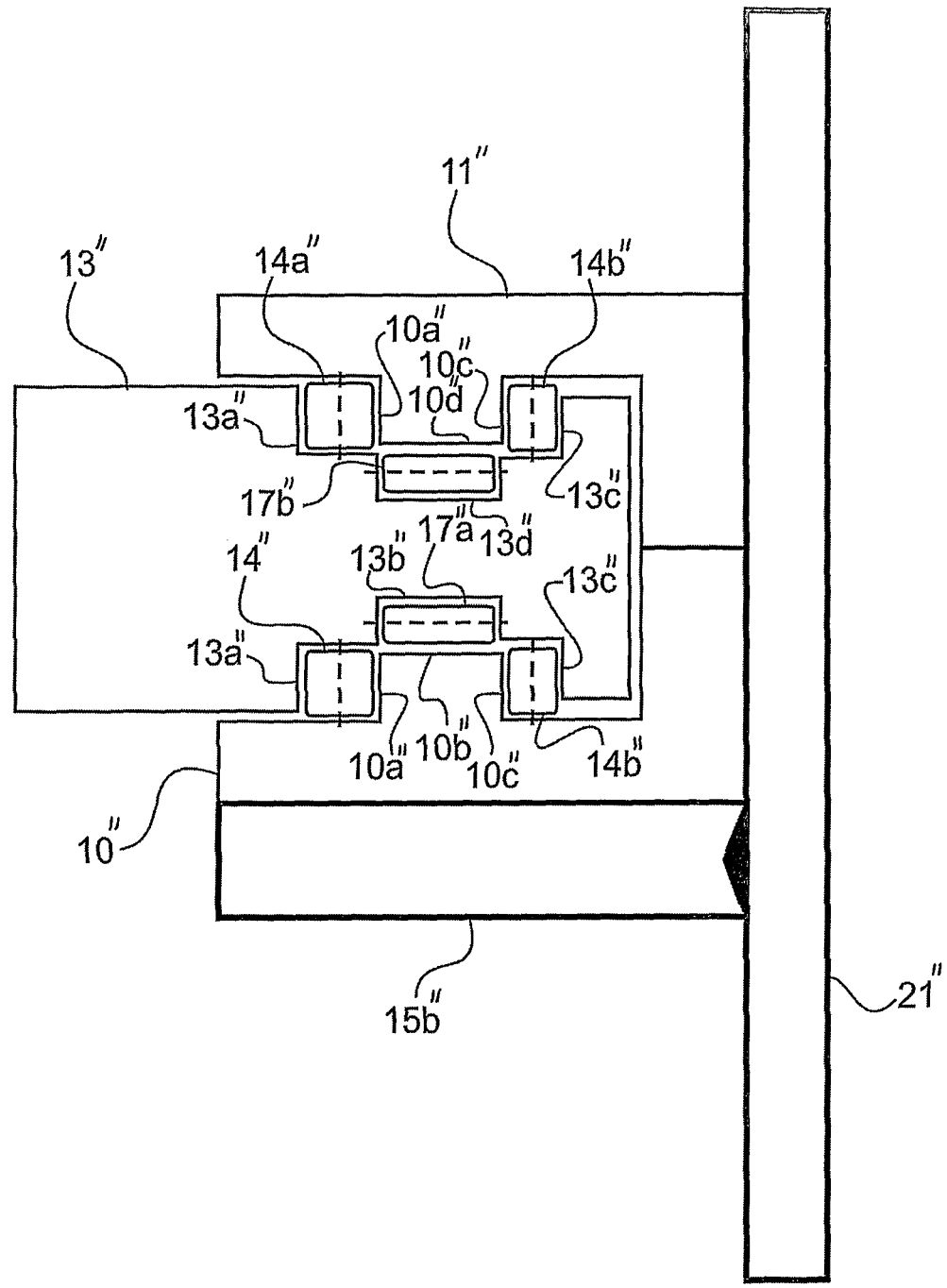
FIG. 5 shows another alternative embodiment of an annular bearing according to the first aspect of the invention.

FIG. 5 depicts schematically an alternative bearing structure according to the invention. Same parts have been given same numbers provided with a double prime (") and similar components have been kept away.

Figure 6:
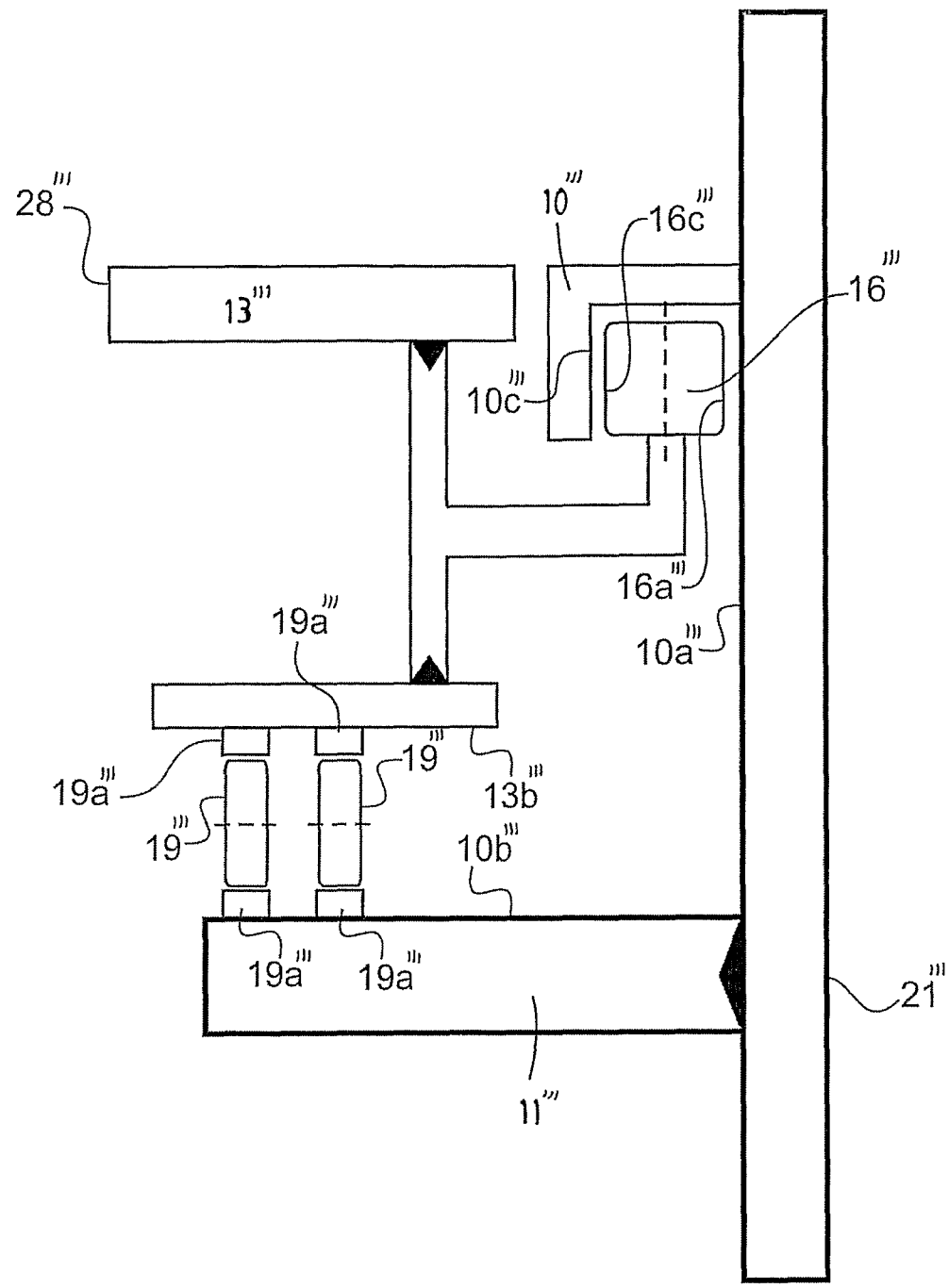
FIG. 6 shows yet another alternative embodiment of an annular bearing according to the first aspect of the invention.

FIG. 6 depicts schematically yet another alternative bearing structure according to the invention. Same parts have been given same numbers provided with a triple prime ('") and similar components have been kept away.

The annular bearing structure is provided between the vertical column 21'" and the jib connection member 28'" and comprises:
- a column bearing part comprising a first column bearing surface 10a'" oriented substantially vertically, which column bearing part is in the shown embodiment directly connected to the column 21'";
- a column bearing part 10'" connected to the column 21'" by welding, comprising a third substantially vertically oriented column bearing surface 10c'";
- a column bearing part 11'" connected to the column 21'" by welding, comprising a second column bearing surface 10b'", oriented substantially horizontally.

The annular bearing structure further comprises a jib bearing part 13'", connected to the jib connection member 28'", comprising a second jib bearing surface 13b'", oriented substantially horizontally opposite and above the second column bearing surface 10b'". Instead of horizontal rollers between horizontal bearing surfaces 10b'" and 13b'" flanged rollers 19'" encircling the column 21'" on rails 19a'" are provided.

The jib bearing part 13'" further comprises load rollers 16'", preferably arranged in a linked sequence forming a chain of radial load rollers. These load rollers 16'" are arranged between first and third column bearing surfaces 10a'" and 10c'". Load rollers 16'" are capable of rotating the jib when driven with a motor. Rollers 16'" define first jib bearing surfaces 16a'" associated with the jib connection member. Jib bearing surfaces 16*a*''', positioned in a radial outward direction of the first column bearing surface 10*a*''', support radially inwards directed horizontal loads. Third jib bearing surfaces 16*c*''' defined by roller 16''' are positioned in a radial inward direction of the third column bearing surface 10*c*''' and absorb radially outward directed forces.

Figure 7:
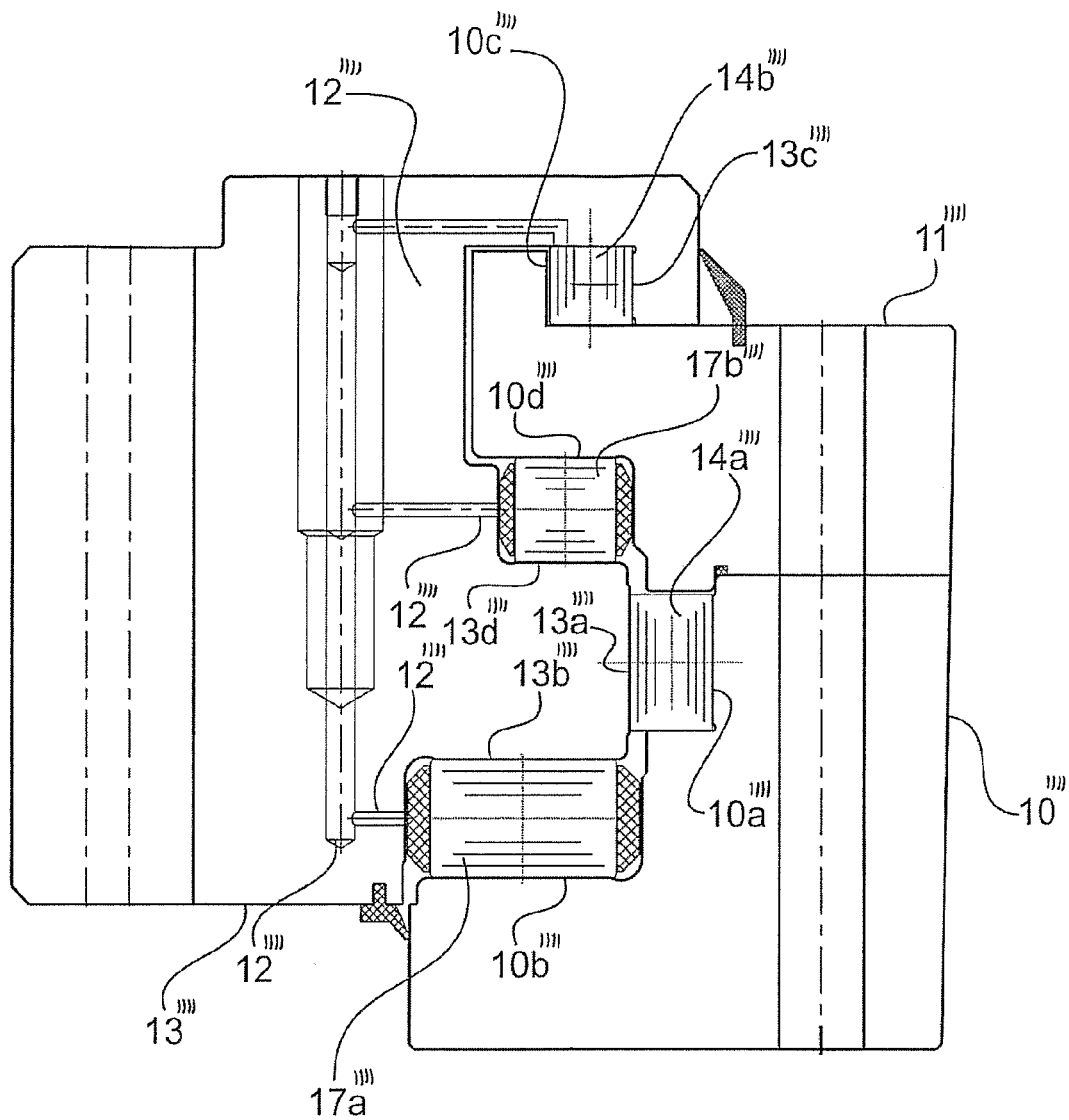
FIG. 7 shows yet another alternative embodiment of an annular bearing according to the first aspect of the invention.

FIG. 7 depicts schematically yet another alternative bearing structure according to the invention. Same parts have been given same numbers provided with a quadruple prime ('''') and similar components have been kept away. Lubricant channels 12'''' are included in this bearing structure, through which a lubricant can be added between the bearing surfaces and the rollers.

Figure 8:
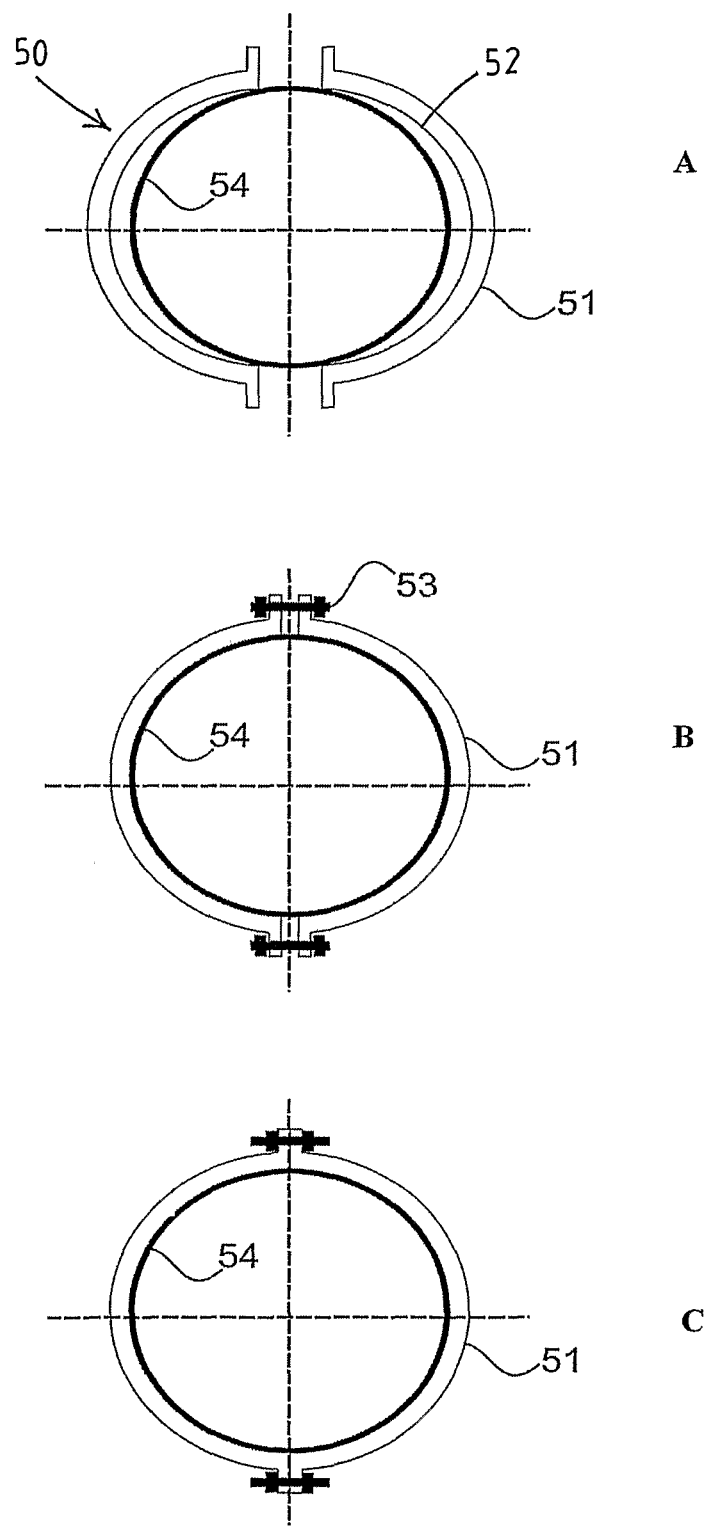
FIGS. 8a-8c shows an embodiment of an annular bearing according to the second aspect of the invention.

FIGS. 8*a*-8*c* show an annular bearing 50 according to the second aspect of the invention. Two bearing parts 51 comprising substantially vertical jib bearing surfaces 52 associated with the jib connection member are arranged around column bearing surface 54 associated with the column. The bearing parts 51 are connected to each other by bolts 53. The bearing parts 51 are stressed in a radially inward direction to prevent radially outward directed displacement of one or more of the bearing parts 51 associated with the jib connection member, in particular bearing parts situated radially opposite the jib. The stresses are preferably induced by heating the bearing parts 51 to at least 60° C. and subsequently cooling them down, e.g. by rinsing them with ice water. Alternatively, the stresses are induced by tightening the bolts.

Figure 9:
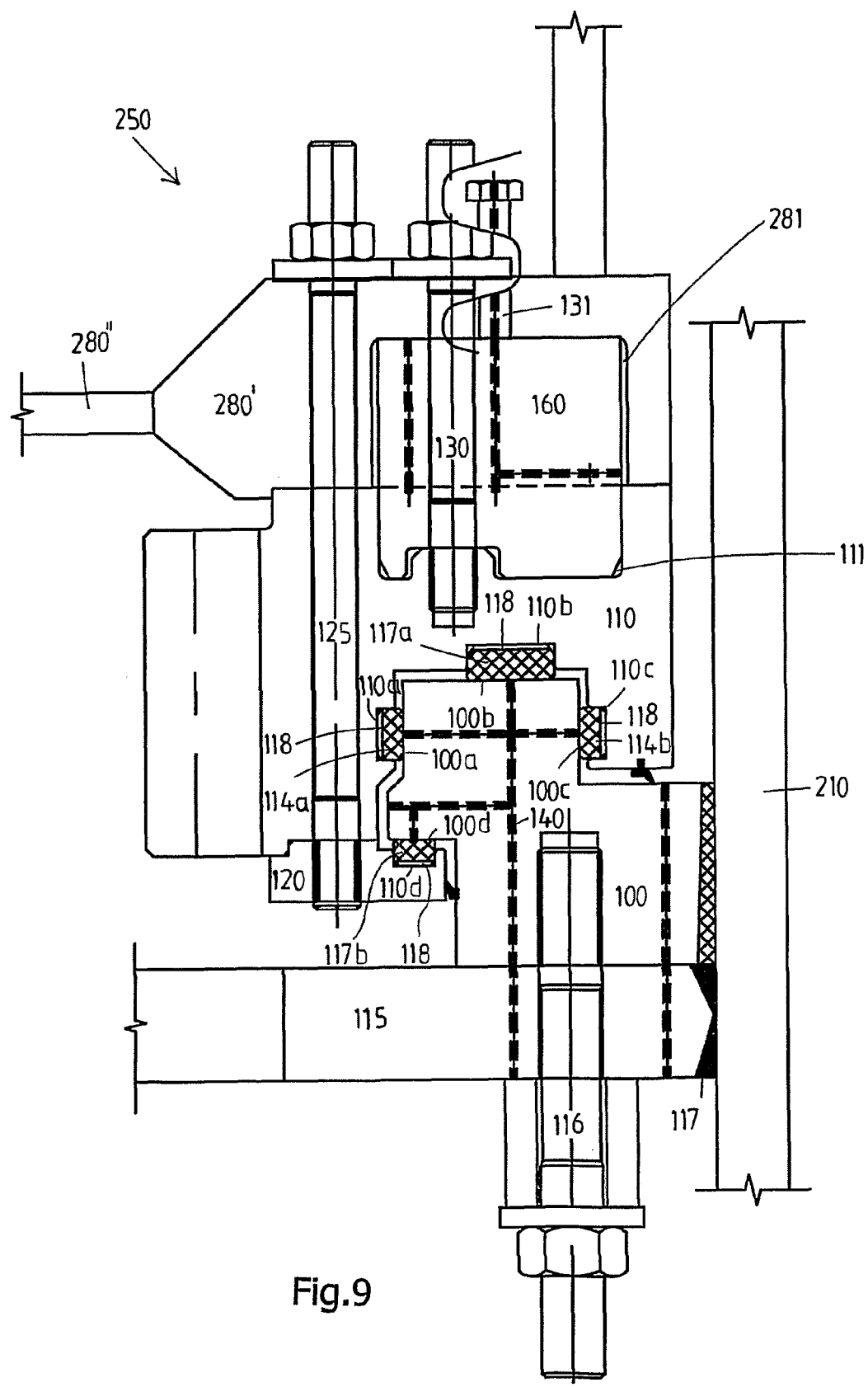
FIG. 9 shows an embodiment of an annular bearing according to the first and third aspect of the invention, FIGS. 10a and b shown the embodiment of the annular bearing of FIG. 9 in a view from above, FIGS. 11a and b show details of the embodiment of the annular bearing of FIG. 9

In FIG. 9 an alternative embodiment of an annular bearing structure 250 is shown. The annular bearing structure 250 is provided between a vertical column 210 and the jib connection member 280 and comprises, in this embodiment, a column bearing part 100 connected to the column 210 via bolts 116 to a load bearing support 115, which in turn is connected to vertical column 210 by welding 117. The column bearing part 100 comprises bearing surfaces associated with the vertical column 210.

Figure 12:
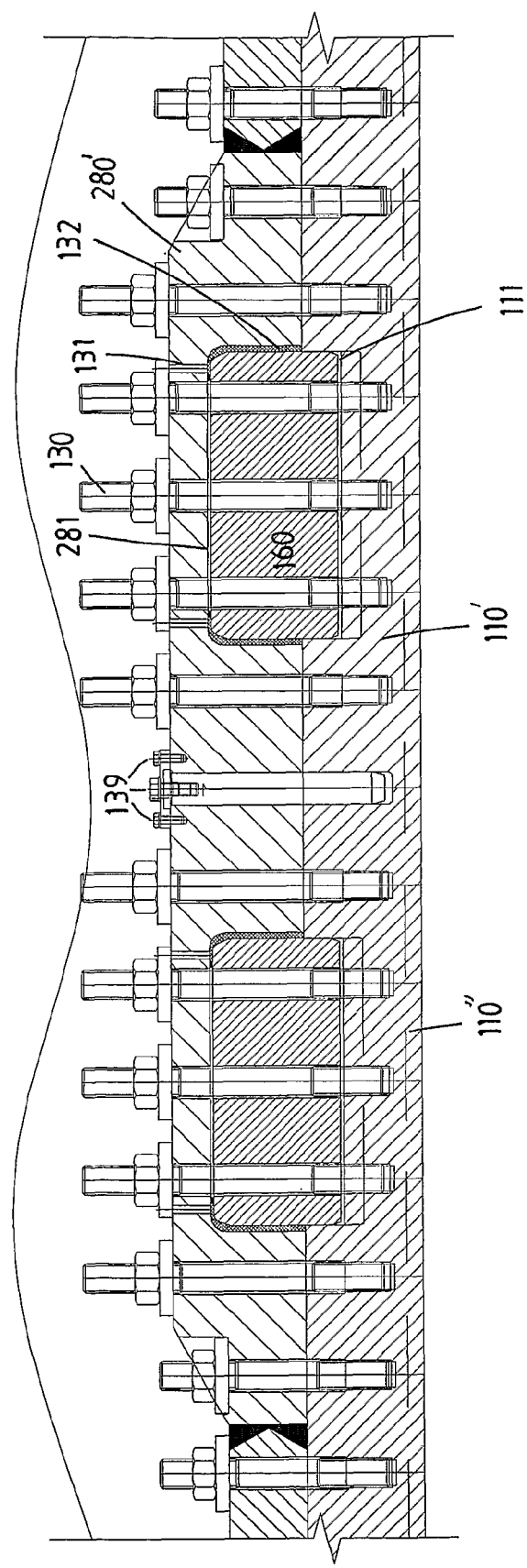
FIG. 12 shows a detail of the embodiment of the annular bearing of FIG. 9

The jib connection member 280 comprises two components 280' and 280" which are connected to each other via welding. Jib connection member 280' comprises a recess 281, in which a spline 160 is partially positioned. Such a spline 160 is preferably made as a single, rigid metal block. A detail in cross-section is shown in FIG. 12.

The annular bearing structure 250 of the shown embodiment further comprises jib bearing parts 110, 120, comprising jib bearing surfaces associated with the jib connection member 280. Opposite recess 281 in the jib connection member 280' is a recess 111 in bearing part 110, in which the spline 160 is also partially provided, to connect the jib bearing part 110 with the jib connection member 280'. A vertical bolt 130 extends through the spline 160 to connect the spline 160 to the jib bearing part 110 and to the jib connection member 280'. Jib connection member 280' comprises a grouting supply opening (not shown) and one or more grouting channels 131, which grouting channel 131 has an opening in the recess 281 of the jib connection member 280' in order to fill voids in the recess 281 around the spline 160 with grouting 132. Such grouting may be any type of filling, preferably a synthetic type of filler. In FIG. 12 two adjacent jib bearing parts 110' and 110" are shown, each comprising a spline 160 and interconnected with bolts 139.

Figure 10B:
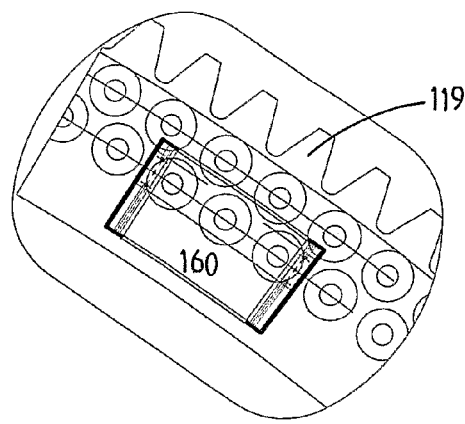
Figure 10A:
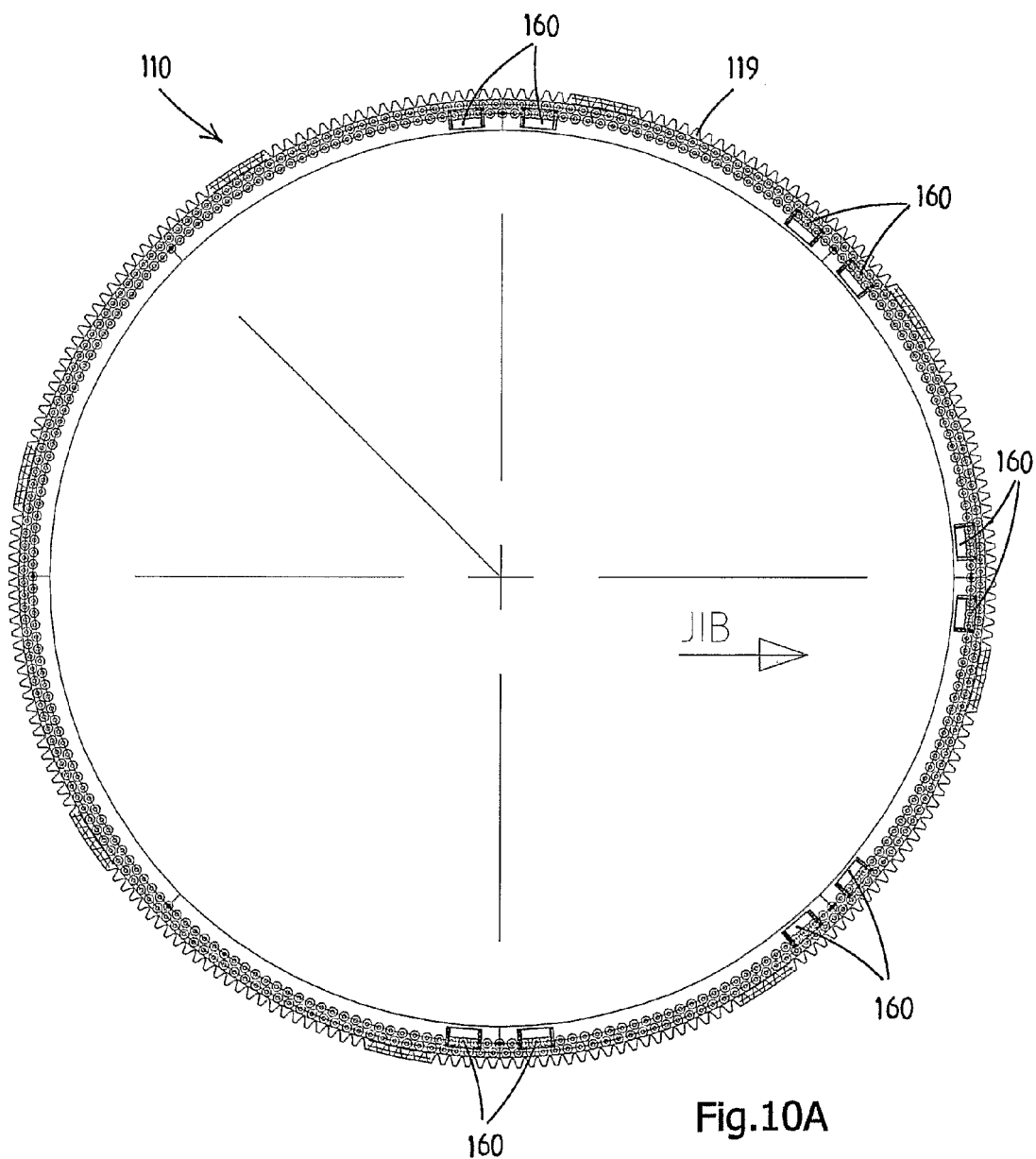

It is noted that the one or more splines may preferably only be provided in a portion of the annular bearing, preferably only at the semi-circular portion to which the jib is connected. This is shown in FIG. 10*a*, in which the annular jib bearing part 110 associated with the jib connection member 280 is shown in a view from above. Jib bearing part 110 is in the shown embodiment composed of 8 segments. Teeth 119 (also visible in FIG. 9) project radially outwards from the bearing part 110. A drive motor is preferably connected with the column to drive a pinion engaging with the gear ring 118, to drive the jib connection member 280 around column 210. Splines 160 are schematically indicated, in FIG. 10*b* in an enlarged view.

Jib bearing parts 110, 120 and jib connection member 280' are in addition connected to each other via bolts 125.

The column bearing part 100 comprises bearing surfaces associated with the vertical column 210:

a substantially vertically extending first column bearing surface 100*a*, a substantially vertically extending third column bearing surface 100*c*, a substantially horizontally extending second column bearing surface 100*b*, a substantially horizontally extending fourth column bearing surface 100*d*.

Jib bearing parts 110, 120 comprise bearing surfaces associated with the vertical column 210:

a substantially vertically extending first jib bearing surface 110*a*, a substantially vertically extending third column bearing surface 110*c*, a substantially horizontally extending second column bearing surface 110*b*, a substantially horizontally extending fourth column bearing surface 110*d*.

First column bearing surface 100*a* provided on bearing part 100 associated with the vertical column 210 is arranged in a radial direction more inwards than the first jib bearing surface 110*a* provided on bearing part 110 associated with the jib connection member 280'. First jib bearing surface 110*a* is arranged opposite first column bearing surface 100*a*, and in this embodiment the bearing surfaces are also arranged parallel. This construction supports radially inwards directed horizontal loads from the jib connection member to the column.

In an alternative arrangement (not shown), it is conceivable to have opposite bearing surfaces that are not parallel. For example, semi-circular bearing surfaces may be applied operating as elements in a groove, or opposite semi-circular bearing surfaces between which ball bearings are provided.

Second column bearing surface 100*b* is arranged below and opposite the second jib bearing surface 110*b*. This construction supports downwardly directed vertical loads from the jib connection member 28 to the column 21. These loads e.g. occur as a result of hoisting by the crane.

Vertically extending third column bearing surface 100*c* is arranged in a radial direction more outwards than and a third jib bearing surface 110*c*. Third jib bearing surface 110*c* is arranged opposite third column bearing surface 100*c*, and in this embodiment the bearing surfaces are also arranged parallel. This construction prevents radially outward directed displacement of bearing part 110 associated with the jib connection member 280', which possibly occur at the side of the bearing opposite the jib.

The annular bearing structure further comprises a fourth horizontally extending bearing surfaces 100*d* and 110*d*, wherein fourth column bearing surface 100*d* is arranged above fourth jib bearing surface 110*d* provided on bearing part 120 associated with the jib connection member 280', to support upwardly directed vertical loads from the jib connection member to the column 210, which possibly occur as a result of the use of the crane. Fourth jib bearing surface 110*d* is arranged opposite fourth column bearing surface 100d, and in this embodiment the bearing surfaces are also arranged parallel.

Between opposite vertical first column bearing surface 100a and first jib bearing surface 110a, and between opposite vertical third column bearing surface 100c and third jib bearing surface 110c, first and second vertical orientated pads 114a, 114b are provided respectively. Between opposite horizontal second column bearing surface 100b and second jib bearing surface 110b, and between opposite horizontal fourth column bearing surface 100d and fourth jib bearing surface 110d, first and second horizontal orientated pads 117a, 117b are provided respectively to facilitate the mutual movement of the bearing surfaces. These sliding pads are preferably polymer pads, more preferably pads made of Orkot (brand name).

Figure 11B:
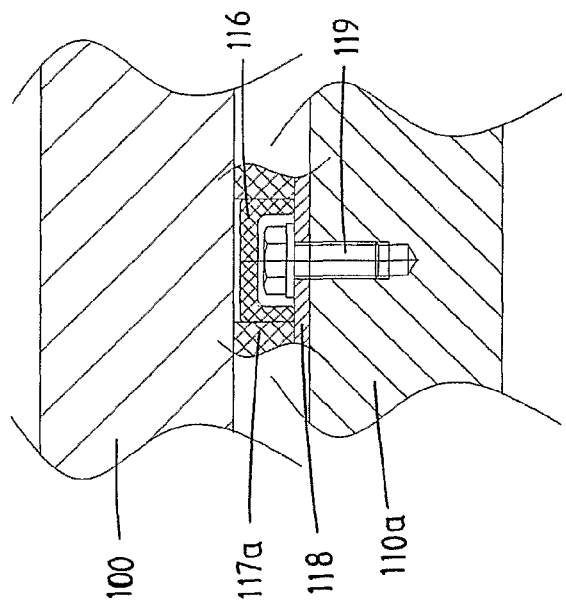
Figure 11A:
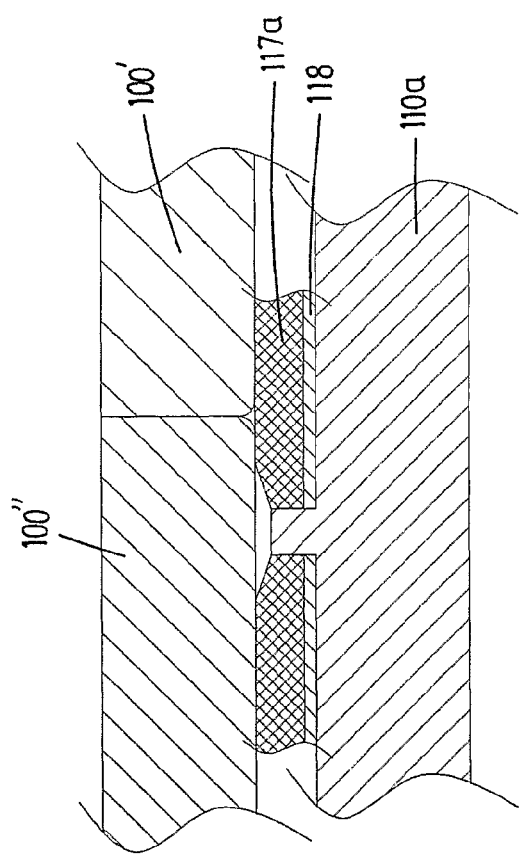

In the shown embodiment pads 114a, 114b, 117a and 117b are mounted to the jib bearing surfaces 110a, 110c, 110b and 110d respectively. A detail of the mounting of a pad 117a to a bearing surface 110a is shown in FIGS. 11a and 11b, in which a metal backing-strip 118 is visible. A single pad extending around the entire annular bearing may be provided, or alternatively multiple spaced apart pads. The pads are preferably mounted to the bearing surface at multiple positions via bolts 119, as visible in FIG. 11b. The bolt may be covered by a cover 116. Alternatively, the pads may be mounted to the column bearing parts. In FIG. 11a, two adjacent column bearing parts 100' and 100" are visible. The entire annular bearing may be composed of multiple adjacent segments of column bearing parts 100.

In this embodiment, column bearing part 100 comprises multiple fluid channels 140 and the annular bearing structure comprises a fluid supply opening (not shown), capable of supplying the fluid channels 140 with fluid, and wherein the column bearing surfaces are provided with orifices of the fluid channels. This fluid preferably is a type of lubricant.

The invention claimed is:

1. Hoisting crane, comprising:
a substantially hollow vertical column comprising a foot and a top and a body between the foot and the top,
a jib, a jib connection member which is disposed on the column and to which the jib is connected pivotably,
an annular bearing structure extending around the column guiding and carrying the jib connection member rotatable about the column, the annular bearing structure comprising:
one or more column bearing parts connected to the column, comprising column bearing surfaces associated with the vertical column; and
one or more jib bearing parts connected via bolts to the jib connection member, comprising jib bearing surfaces associated with the jib connection member;
wherein a first column bearing surface is oriented substantially vertically and is arranged in a radial direction more inwards than a first jib bearing surface arranged opposite the first column bearing surfaces, to support radially inwards directed horizontal loads from the jib connection member to the column;
wherein a second column bearing surface is oriented substantially horizontally and is arranged below a second jib bearing surface arranged opposite the second column bearing surfaces to support downwardly directed vertical loads from the jib connection member to the column; and
wherein the jib bearing parts and the jib connection member comprise opposite recesses in which one or more splines are provided to connect the jib bearing parts with the jib connection member, in addition to the connection via the bolts.

2. Hoisting crane according to claim 1, wherein at least one vertical bolt extends through each spline to connect the spline to the jib bearing parts and to the jib connection member.

3. Hoisting crane according to claim 1, wherein the jib connection member comprises a grouting supply opening and one or more grouting channels, which grouting channel has an opening in the recess of the jib connection member in order to fill voids in the recess around the spline with grouting.

4. Hoisting crane according to claim 1, wherein the one or more splines are only provided in a portion of the annular bearing, preferably only at the semi-circular portion at which the jib is located.

* * * * *